July 4, 1933.  C. H. HARTMAN  1,916,664
CUTTER FOR SEVERING BAG LENGTHS FROM PAPER TUBES
Filed Aug. 5, 1927  5 Sheets-Sheet 1

Fig. 1

Inventor
Carl H Hartman.
By Owen & Owen
Attorneys

July 4, 1933.   C. H. HARTMAN   1,916,664
CUTTER FOR SEVERING BAG LENGTHS FROM PAPER TUBES
Filed Aug. 5, 1927   5 Sheets-Sheet 3

Inventor
Carl H. Hartman.
By Owen & Owen
Attorneys

July 4, 1933. C. H. HARTMAN 1,916,664
CUTTER FOR SEVERING BAG LENGTHS FROM PAPER TUBES
Filed Aug. 5, 1927 5 Sheets-Sheet 4

Inventor
Carl H. Hartman.

Attorneys

Patented July 4, 1933

1,916,664

UNITED STATES PATENT OFFICE

CARL H. HARTMAN, OF TOLEDO, OHIO, ASSIGNOR, BY MESNE ASSIGNMENTS, TO ST. REGIS PAPER COMPANY, OF NEW YORK, N. Y., A CORPORATION OF NEW YORK

CUTTER FOR SEVERING BAG LENGTHS FROM PAPER TUBES

Application filed August 5, 1927. Serial No. 210,902.

My invention relates to a cutter for severing bag lengths from a paper tube, and more particularly for severing bag lengths each having an extension at one corner for the purpose of forming a valve.

The object of my invention is to provide a cutter which will cut successive bag lengths from a tube as the tube is passed continuously forward at a rapid speed, and which will at the same operation form the end of the cut length with a desired extension.

The details of my improvements and the objects thereof will appear as the description proceeds.

In the accompanying drawings forming a part of this specification.

The apparatus shown in the drawings is indicated as being mounted upon side frames 20 and 21, which are joined by shafts operating the several parts of the apparatus, and by any other suitable cross pieces. The mechanism includes a shaft 22 carrying suitable cutters, a shaft 23 carrying abutment bars against which the cutters operate, a shaft 24 carrying an adjustable pinch bar and a shaft 25 carrying a cylinder mating with the pinch bar, for feeding paper tubing to the cutter, a shaft 26 carrying a more rapidly moving pinch bar and a cylinder on shaft 27 mating with the last said pinch bar and operating to remove cut sections at a speed slightly more rapid than the feeding of the tube to the cutter.

Shaft 23 carries a gear 28. At one side of gear 28 there is a drive shaft 29. Idler shaft 29 carries a gear 31 meshing with gear 28 and with a gear 32 on shaft 25. Above the path of the paper there is an idler shaft 33 connected by a link 34 to shaft 24. An idler gear 35 is mounted upon a shaft 33 and meshes with gear 36 on shaft 24 and gear 37 on shaft 22. A comparatively large gear 38 on shaft 22 meshes with gear 28 on shaft 23.

At the other side of shaft 23 from idler shaft 29 there is an idler shaft 39. Shaft 39 carries a gear 41 meshing with gear 28 and with a gear 42 on shaft 27. At the other end of shaft 27 from gear 42 there is a slightly larger gear 43 which meshes with a gear 44 of the same size on shaft 26.

A drive pulley 45 is mounted upon shaft 29, and as will be clearly seen from the above described connection of the gearings, rotation of shaft 29 forces the rotation of all of the other shafts described above.

A holding pinch bar 46 is mounted upon shaft 24 by means of brackets 47, which are made adjustable by slots 48 and screws 49, so that the distance of the bar from the axis of the shaft may be adjusted at will. A cylinder 50 is mounted on shaft 25 and acts as an abutment against which bar 46 holds the paper when the bar is rotated into engagement with the paper.

On shaft 26 there are mounted discs 51 which carry a pulling pinch bar 52 adapted to pinch the paper against a cylinder 53 mounted upon shaft 27.

For cutting the ends of the bag length which have extensions, as mentioned above, there is provided a bar 54 having a plurality of knives. The bar 54 has attached to each end thereof a carrier 55 provided with a cam roller 56 running in a cam groove 57 in a cam 58 attached by an adjustable slot and bolt attachment 59 to a fixed part of the frame.

The cutter bar is provided with knife slots 60 for receiving suitable cutting knives. As viewed in Figs. 5 and 8, there are provided a long upper knife 61, adapted to extend nearly across the tube which is cut, and a similar lower knife 62, with a short cross knife 63 bridging the space between knives 61 and 62 at the right end and a short knife 64 bridging the space between knives 61 and 62 at the left end. The knives may be held clamped in the slots by means of screws 65, and may be extended to the desired distance beyond the slots by adjusting screws 66 bearing against the backs of the knife blades. The position of cross knives 63 and 64 may be varied by adjustment in spaces 67. In the construction shown, there is a bar 68 between the knives, this bar being supported by guide bolts 69 and normally thrust towards the edges of the cutting knives by means of springs 70.

Mating with the knives just described there is a grooved bar 71. Bar 71 has a carrier 72 at each end thereof provided with a cam roller 73 running in a groove 74 in fixed cam 75. The bar is provided with grooves 76 adapted to receive the cutting knives when the knives are thrust through the material to be cut. Between the said grooves there is an abutment strip 77 held in position by screws 78. This abutment strip is provided with a concave surface 79 adapted to mate with a convex surface 80 on the bar 68. Supplemental strips 77', similar to strip 77, are provided outside of cross knives 63 and 64, strips 77 and 77' providing slots between their ends for the entrance of knives 63 and 64.

Mounted between bar 71 and shaft 23 there is a spear-carrying bar 81. Bar 81 has on each end thereof a roller 82 operating in a groove 83 in cam 75. Extending outward from bar 81 there are spears 84 which pass through holes 85 in bar 71 and during the cutting operation are forced through the material to be cut into holes 86 in bar 68.

On the opposite side of shaft 22 from bar 54 there is a bar 87 carrying a single cutting knife in the manner well known in the art. Bar 87 is supported at each end by carrier 88 having a cam roller 89 running in cam groove 57 in cam 58.

On the opposite side of shaft 23 from groove bar 71 there is a bar 90 having a single groove adapted to mate with the single knife in bar 87. Bar 90 is provided with carriers 91 having cam rollers 92 running in groove 74 in cam 75.

Figure 5:
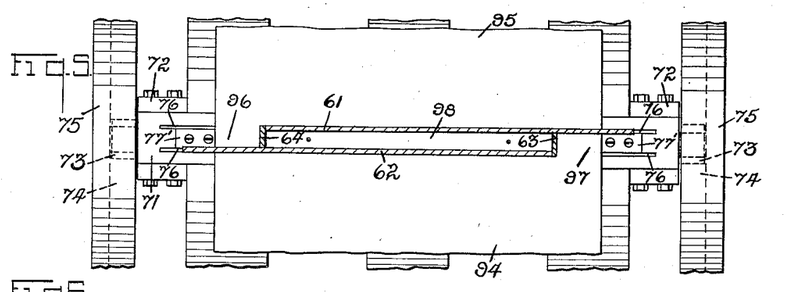
Fig. 5 is a horizontal section on the line 5—5 of Fig. 4 through the cutting knives, which are indicated in cutting position in Fig. 1.
Figures 6, 7:
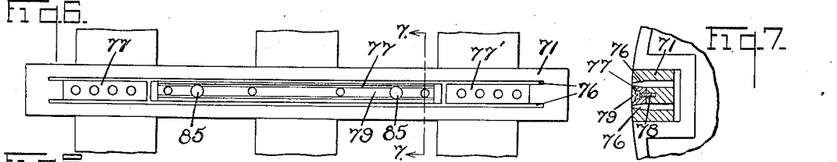
Fig. 6 is a face view of a grooved abutment bar.
Fig. 7 is a section on the line 7—7 of Fig. 6.

It will be understood that a paper tube 93 is received continuously from a suitable source of supply, such as a tube forming apparatus. The cutter is adapted to cut such a tube into successive lengths, alternate lengths of which are differently positioned. For example, as shown in Fig. 5, there is a lower bag length 94 and an upper bag length 95, the lower bag length having an extension 96 shown on the left hand side of the view, and the upper bag length having a similar extension 97 shown on the right hand side of the view. In the space between the knives there is a rectangular portion 98 which is cut out and discarded.

It will be further understood that the cutter bars 54 and 87 are rotated by means of suitable arms 99 extending outward from shaft 22, the bars being mounted in suitable slideways in said frames. Similarly, bars 71, 81 and 90 are mounted in suitable slideways in arms 100 extending from shaft 23.

Figure 14:
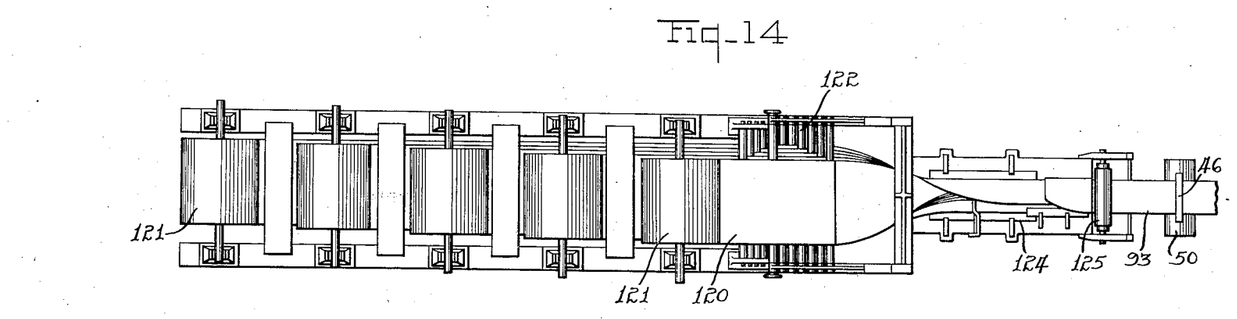
Figs. 14 and 15 are a diagrammatic plan and side elevation, respectively, of a tube forming device suitable for use with the cutter.
Figure 15:
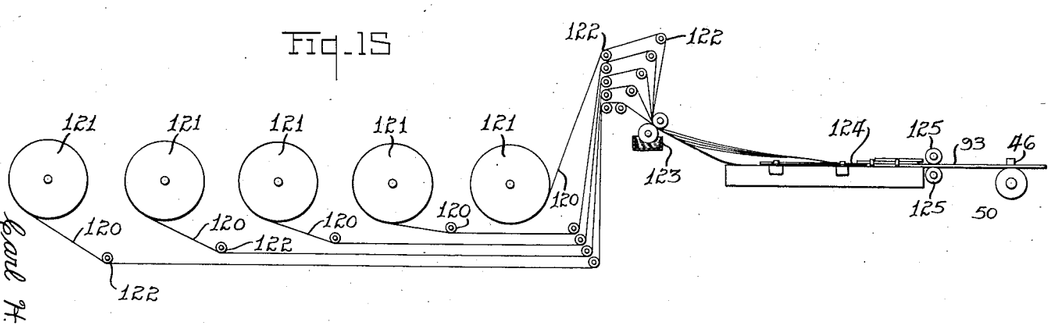

The tube may be made by any suitable tube-making apparatus, but there is shown in Figs. 14 and 15 a diagrammatic plan and side elevation of a tube forming device which is suitable for supplying a tube to the cutting device, and which is similar to the device shown in detail in a patent to Adelmer M. Bates for Process and apparatus for forming tubes, Ser. No. 1,634,067, granted June 28, 1927. In this device a plurality of sheets of paper 120 are drawn from supply rolls 121 over suitable guiding rolls 122 to an adhesive-applying device 123, from which they are drawn through a folding device 124 which forms them into a multi-ply tube with a gusset fold in each side. The tube is drawn through the folding device by roller 125 and delivered to the cutting device.

When the paper is fed to the cutting apparatus it is received over cylinder 50 on shaft 25 and under pinch bar 46 on shaft 24. The gearing is such that shafts 24 and 25 revolve twice during each revolution of shafts 22 and 23, and the movement is so timed that bar 46 is in contact with the paper each time that the knives carried by shaft 22 are brought into operation. The pinch bar is pressed down upon the paper by springs 101, and may be suitably adjusted by hand wheels 102. In this way the paper is firmly held upon the receiving side of the cutting apparatus during the cutting operation.

Shafts 26 and 27 are likewise rotated twice for each revolution of shafts 22 and 23, and are so operated that bar 52 is in contact with the paper during each cutting operation. Radii of gears 43 and 44 and cylinder 53 and the distance of pinch bar 52 from the axis of shaft 56 is slightly greater than the radius of gear 42. For this reason the motion of pinch bar 52 and cylinder 53 is slightly more rapid than that of the cutter bars.

It will be seen that two bag-lengths are cut from the tube during each revolution of shafts 22 and 23, and the speed of rotation of the shafts is regulated in relation to the rate at which the tube is received so that the bag-lengths are of the desired length. The distance of the cutter bars and cooperating grooved bars from the respective shafts is such that the cutters move at a speed equal to or slightly in excess of the rate of movement of the tube for the longest lengths of bag that are to be cut by the device. For shorter lengths, the speed of the knives is greater in relation to the rate of movement of the tube.

Pinch bar 46 is adjusted towards its axis for shorter lengths and outward for longer lengths, so that its speed is substantially equal to that at which the tube is received.

By this arrangement the paper is held taut during the cutting operation and the severed length is moved away from the cutting device at a speed slightly greater than that at which it is received, so that a gap is opened up between the severed length and the oncoming length of the unsevered tube. Pinch bar 52 is pressed against cylinder 53 by means of springs 103 adjusted by screws 104.

Cylinder 50 is loose on shaft 25, so that, while the cylinder tends to rotate with the same frequency as shaft 25 and at a peripheral speed equal to the speed of the cutter bars, it is readily retarded to the speed of the tube by the pinch bar 46 pressing the tube into frictional contact therewith. Successive operations of the pinch bar keep cylinder 50 rotating at the speed of the tube, without any adjustment of the cylinder for different speeds, and the turning of shaft 25 upon which the cylinder is mounted relieves the tube of the pull which would be exerted thereon to keep the cylinder rotating if the cylinder was mounted upon a stationary shaft.

Figure 1:
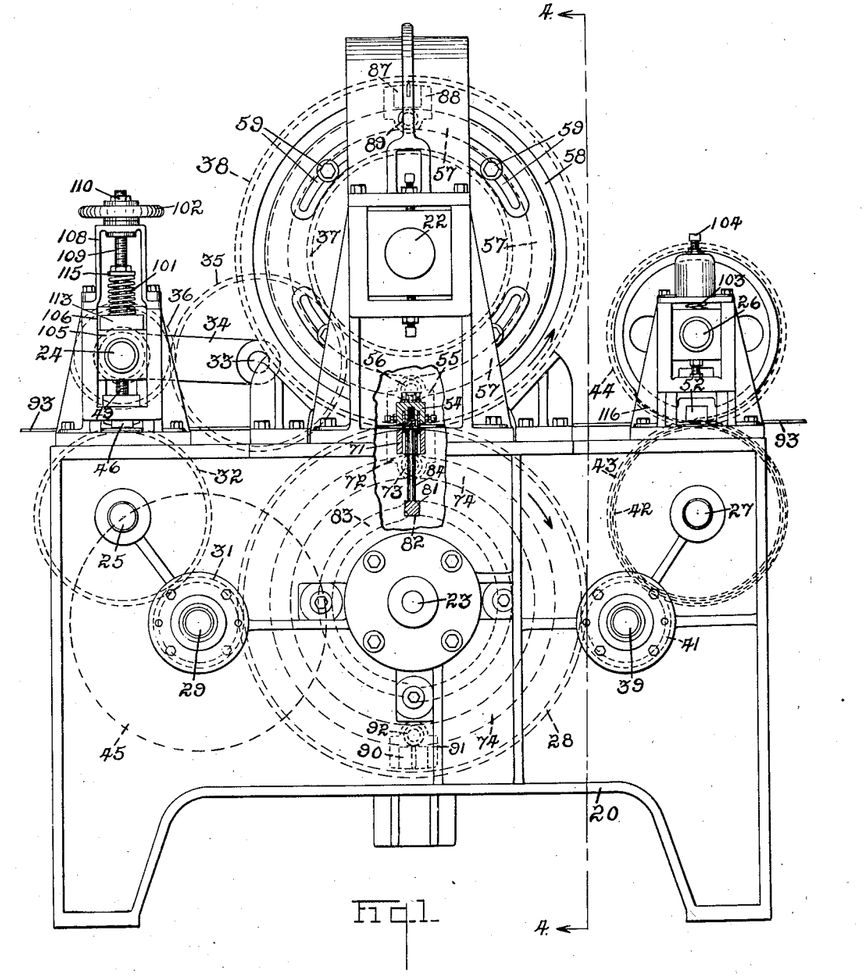
Figure 1 is a side elevation, partly diagrammatic and partly broken away, indicating one form of apparatus embodying my invention.
Figure 2:
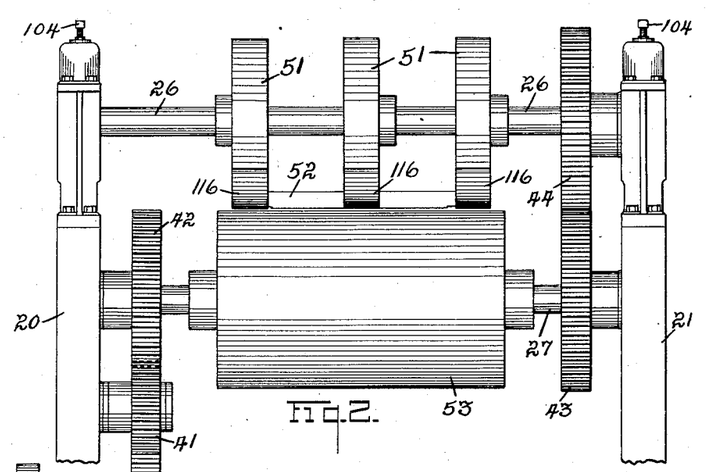
Fig. 2 is a partial end elevation looking at the right end of the apparatus, as shown in Fig. 1.
Figure 3:
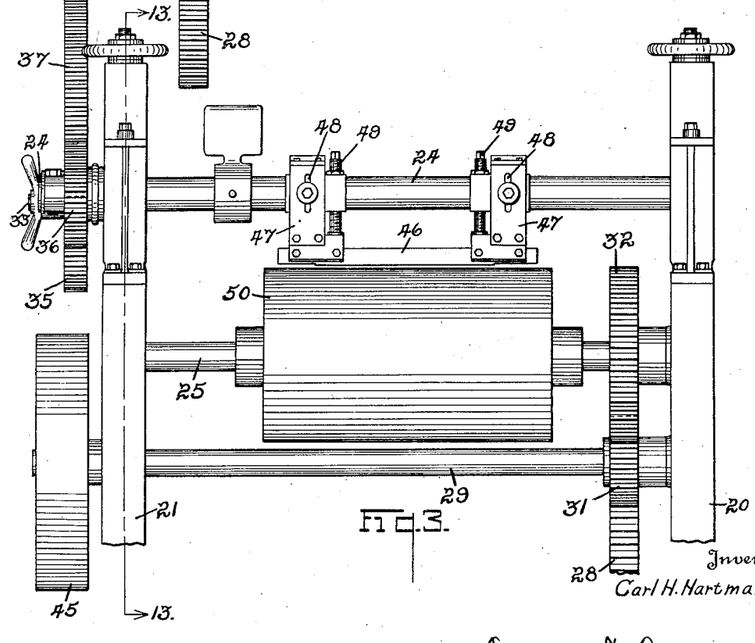
Fig. 3 is a partial end elevation looking at the left end of the apparatus as shown in Fig. 1.
Figures 4, 13:
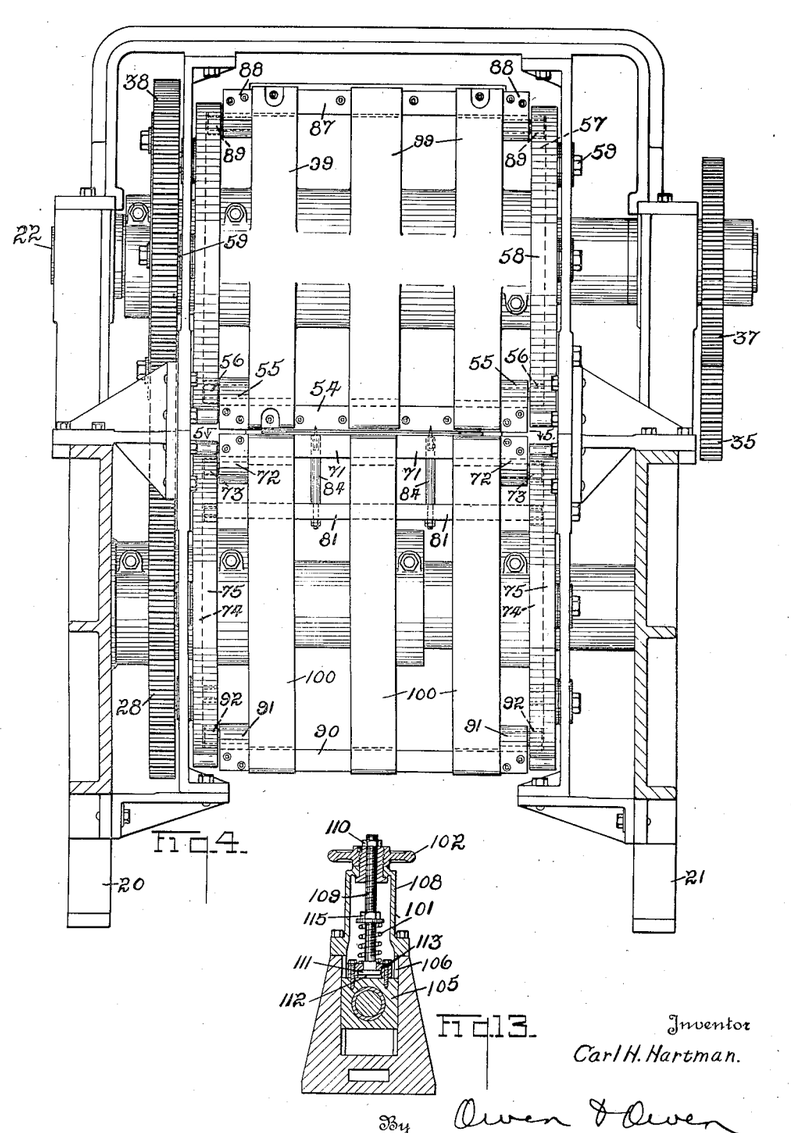
Fig. 4 is a vertical section on the line 4—4 of Fig. 1.
Fig. 13 is a detail section on the line 13—13 of Fig. 3.

While shaft 24 may be mounted in various ways, the mounting shown in the drawings, particularly in detail Fig. 13, is a very satisfactory arrangement. As shown, the end of the shaft is mounted in a bearing 105 which is vertically movable in a slideway 106. An internally threaded hand wheel 102 is mounted rotatably in a bracket 108 over the slideway. A stem 109 is threaded through the hand wheel, and is locked in position, after a required adjustment has been made, by a lock nut 110. The lower end of stem 109 is provided with a bead 111 which is vertically movable for a limited distance in a space 112 between the upper side of bearing 105 and a plate 113 fastened to said bearing. The stem may be squared, or otherwise out of round, where it passes through plate 113, so that the stem is held against rotation, and rotation of the hand-wheel screws the stem upward or downward. A spring 101 between plate 113 and a nut 115 adjustable in stem 109 serves to aid gravity in holding plate 113 downward as far as allowed by head 111. The stem is adjusted so that pinch bar 46 rests firmly on the tube above cylinder 50, the play allowed by space 112 being sufficient to accommodate the varying thickness of the tube.

The severed lengths are moved by pinch bar 52 into engagement with a suitable delivering conveyor, not shown. In order to make this feeding to the delivery conveyor more positive and certain, I prefer to continue the peripheries of discs 51 at the same distance from shaft 26 as the surface of the pinch bar for a short distance, as indicated at 116. From this point onward the radius of each disc is reduced, so that the discs release the severed lengths immediately after they are securely engaged by the said delivering conveyor. This arrangement renders it unnecessary for the delivery conveyor to be run at any predetermined speed in relation to the pinch bar.

Figures 8, 9, 10, 11, 12:
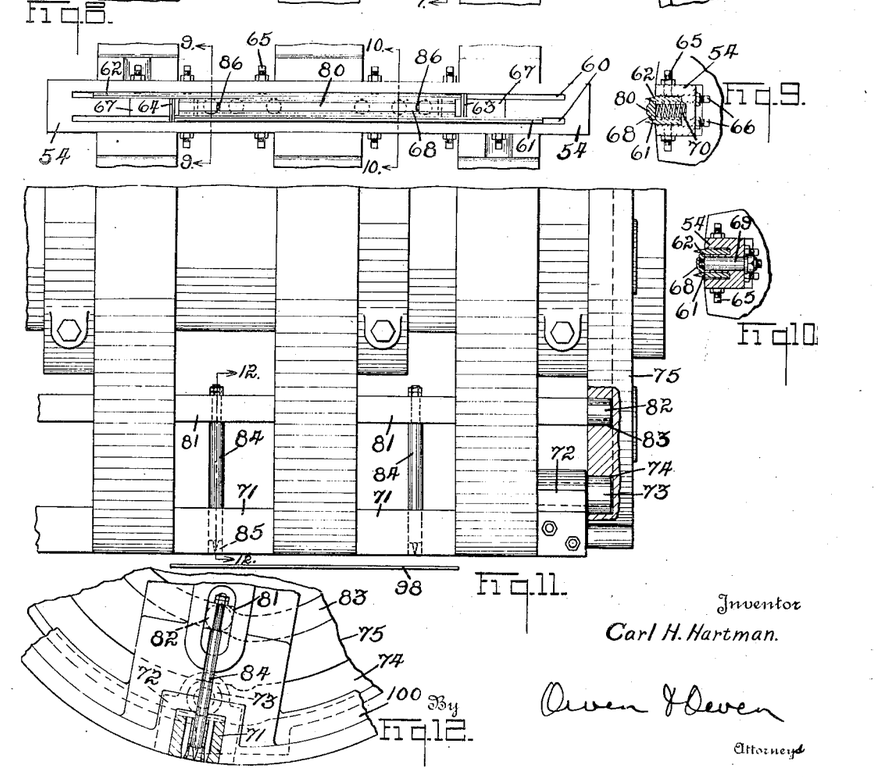
Fig. 8 is a view of the cutter bar which carries a plurality of knives.
Figs. 9 and 10 are sections on the lines 9 and 10, respectively, of Fig. 8.
Fig. 11 is a detail view of a portion of the mechanism shown in a different position from that in which it is shown in Fig. 1.
Fig. 12 is a detail section on the line 12—12 of Fig. 11.

During the operation of the machine, cutter bar 54 and its co-operating abutment bar 71 are suddenly forced together by cams 58 and 75 when they are brought into registry with each other; and are retracted by those same cams immediately after they pass the center. When these bars are thus thrust towards each other, the knives cut through the paper into the grooves of the bar and the rectangular portion 98 is gripped between the concave surface 79 of bar 77 and the convex surface 80 of bar 68. At the same time spears 84 are thrust through this rectangular portion by reason of the contour of cam groove 83. Grove 83 is so shaped that the spears continue to remain in their outward position until the carrier mounted on shaft 23 has brought bar 71 to a position from which it is desired to discharge the waste portion 98, whereupon the spears are withdrawn, as illustrated in Figs. 11 and 12. This frees the waste paper 98, and it is discharged into any desired receiving means.

It will be seen from the above description that I have provided a cutting apparatus which will operate continuously and automatically at high speed to receive a continuous length of paper tube and cut it into successive bag lengths, each having an extension at one corner thereof, and discharge the bag lengths successively in desired position while discharging at another place the undesired waste paper cut from between the extensions.

It will be readily understood that various modifications may be made in the details of the apparatus shown without departing from the invention, as set forth in the appended claims.

What I claim is:

1. Apparatus for severing a tube comprising a cutter carrier and knives removably mounted in the carrier outlining an inclosed figure and lines running in opposite directions from opposite sides of said figure.

2. In apparatus for severing tubes, a cutter carrier, parallel knives mounted in said carrier longitudinally thereof, and knives mounted in said carrier crossing the space between the first said knives and adjustable longitudinally of the first said knives.

3. In apparatus for severing tubes, means for moving a tube longitudinally, a cutter carrier rotatable about an axis at one side of and transverse the path of movement of the tube, and knives removably mounted in said carrier and outlining a closed figure with knives extending from opposite sides of said figure in directions to reach the opposite sides of the bag tube, the said knives on opposite sides of said closed figure being offset respectively longitudinally of the tube.

4. In apparatus for severing bag tubes, means for moving a tube longitudinally, a cutter carrier rotatable about an axis at one side of and transverse the path of movement of the tube, and four knives mounted in said carrier and outlining a rectangle with knives extending from diagonally opposite corners of the rectangle transversely of the direction of travel of the tube, and far enough to reach the edges of said tube, each side of the rectangle being formed by a separate knife.

5. Apparatus for severing bag tubes, comprising means for moving a tube longitudinally, a cutter carrier rotatable about an axis at one side of and transverse the path of travel of the tube, and parallel knives mounted in said carrier offset laterally of the path of movement of the tube and each in position to reach from one side of the tube to a point adjacent the other side of the tube.

6. Apparatus for severing bag tubes, comprising means for moving a tube longitudinally, a cutter carrier rotatable about an axis at one side of and transverse the path of travel of the tube, parallel knives mounted in said carrier offset laterally of the path of movement of the tube and each in position to reach from one side of the tube to a point adjacent the other side of the tube, and a knife mounted in said carrier, adjacent each side of the path of travel of the tube and in position to bridge the space between said parallel knives.

7. Apparatus for severing bag tubes, comprising means for moving a tube longitudinally, a cutter forming a closed outline and adapted to excise a portion of the tube between its sides and means for removing said excised portion from the cutter and delivering it at one side of the path of travel of the tube.

8. Apparatus for severing bag tubes, comprising means for moving a bag tube longitudinally, a cutter carrier mounted rotatably about an axis at one side of and transverse the travel of the tube, knives mounted in the carrier outlining a closed figure and adapted to excise a portion of the tube, and means mounted upon the opposite side of the path of travel of the tube and adapted to remove portions excised by said knives and deliver said portions at one side of the path of travel of the tube.

9. Apparatus for severing bag tubes, comprising means for moving a bag tube longitudinally, a cutter carrier mounted rotatably about an axis upon one side of and transverse the path of the tube, knives mounted in said carrier and adapted to excise a portion of the tube, a grooved bar mounted rotatably about an axis upon the other side of the path of travel of the tube and adapted to co-operate with said knives, and means passing through said grooved bar and adapted to remove excised portions of the tube from the point where they are cut and deliver them upon the opposite side of the axis about which said bar rotates.

10. Apparatus for severing bag tubes comprising means for moving a bag tube longitudinally, a cutter rotatable about an axis at one side of and transverse the path of travel of the tube, pinch bars mounted upon the opposite sides of the cutter and rotatable about axes parallel with the axis of the cutter, and gearing connecting said pinch bars and cutter and driving the pinch bar on the delivery side of the cutter at a speed slightly greater than that of the cutter and driving the pinch bar on the receiving side of the cutter at a speed materially less than that of the cutter.

11. Apparatus for severing bag tubes, comprising means for moving a bag tube longitudinally, a cutter rotatable about an axis at one side of and transverse the path of travel of the tube, pinch bars mounted upon the opposite sides of the cutter, and rotatable about axes parallel with the axis of the cutter, and gearing connecting said pinch bars and cutter and driving the pinch bar on the delivery side of the cutter at a speed slightly greater than that of the cutter and driving the pinch bar on the receiving side of the cutter at a speed materially less than that of the cutter, and means for adjusting the speed of the pinch bar on the receiving side of the cutter relatively to the speeds of the cutter and pinch bar on the delivery side of the cutter.

12. Apparatus for severing bag tubes comprising means for moving a bag tube longitudinally, a cutter rotatable about an axis at one side of and transverse the path of travel of the tube, pinch bars mounted upon the opposite sides of the cutter and rotatable about axes parallel with the axis of the cutter, and gearing connecting said pinch bars and cutter and driving the pinch bar on the delivery side of the cutter at a speed slightly greater than that of the cutter and driving the pinch bar on the receiving side of the cutter at a speed materially less than that of the cutter, the pinch bar on the receiving side of the cutter being mounted about an axis adjustable towards and from the path of movement of the bag, and said bar being adjustable towards and from its axis.

13. Apparatus for severing bag tubes, comprising means for moving a bag tube longitudinally, a cutter rotatable about an axis at one side of and transverse the path of travel of the tube, pinch bars mounted upon the opposite sides of the cutter and rotatable about axes parallel with the axis of the cutter, and gearing connecting said pinch bars and cutter and driving the pinch bar on the delivery side of the cutter at a speed slightly greater than that of the cutter and driving the pinch bar on the receiving side of the cutter at a speed materially less than that of the cutter, the pinch bar on the receiving side of the cutter being mounted about an axis adjustable towards and from the path of movement of the bag, and said bar being adjustable towards and from its axis, the means for adjusting the axis of said cutter bar comprising an axial shaft, a journal for the shaft, an adjustably mounted rod having a lost motion connection with the journal, and means tending to press the journal towards the path of travel of the tube to the limit of said lost motion connection.

14. Apparatus for severing bag tubes, comprising means for moving a bag tube longitudinally, a cutter rotatable about an axis at one side of and transverse the path of travel of the tube, pinch bars mounted upon the opposite sides of the cutter and rotatable about axes parallel with the axis of the cutter, gearing connecting said pinch bars and cutter and driving the pinch bar on the delivery side of the cutter at a speed slightly greater than that of the cutter and driving the pinch bar on the receiving side of the cutter at a speed materially less than that of the cutter, the pinch bar on the receiving side of the cutter being mounted about an axis adjustable towards and from the path of movement of the bag, and said bar being adjustable towards and from its axis, an abutment cylinder on the opposite side of the path of travel of the tube from the pinch bar on the receiving side of the tube, a shaft upon which said abutment cylinder is loosely mounted, and means for driving said shaft at approximately the speed required to give the cylinder the same peripheral speed as that of the pinch bar.

15. In cutting apparatus, a pinch bar rotatable about an axis and adjustable towards and from the axis, an abutment cylinder in position to cooperate with the pinch bar, a shaft upon which the cylinder is loosely mounted, and means to turn the shaft at a constant speed regardless of the adjustment of said bar.

16. The method of making a valve bag which comprises continuously advancing a length of bag tubing and cutting the continuously advancing tube into successive single bag lengths, each with a lateral valve flap projecting from one end of the bag length.

17. The method of making valve bags which comprises progressively forming a web into a tube, and severing the tube during its forward travel into successive single bag lengths, each with a lateral valve flap projecting from one end of the bag length.

18. In making valve bags, the method which comprises advancing a length of bag tubing, successively at spaced intervals excising rectangular portions of the tube between its side edges, severing the tube along lines running from the diagonally opposite corners of each rectangle to the respective adjacent sides of the tube, and thereby forming a plurality of bag ends, each with a lateral valve flap projecting therefrom at the side of the tube.

19. A bag machine comprising means for forming a paper web progressively into a tube as the web is advanced, and means for cutting the continuously advancing tube into successive single bag lengths, each with a lateral valve flap projecting from one end of the bag length.

20. A bag machine comprising means for forming a paper web progressively into a tube as the web is advanced, and rotary cutter means for severing the continuously advancing tube into successive single bag lengths, each with a lateral valve flap projecting from one end of the bag length.

21. A bag machine comprising means for continuously advancing a length of bag tubing, and means for cutting the continuously advancing tubing into successive single bag lengths, each with a lateral valve flap projecting from one end of the bag length.

22. A bag machine comprising means for continuously advancing a length of laterally pleated bag tubing, and means for cutting the continuously advancing tubing into successive single bag lengths, each with a projecting valve flap in the laterally-pleated area of the bag length.

23. The method of making a valve bag which comprises continuously advancing a length of laterally pleated tubing, and cutting the continuously advancing pleated tubing into successive single bag lengths, each with a valve flap in the laterally pleated area of the tube.

24. The method of making valve bags which comprises progressively forming a web into a laterally pleated tube, and severing the tube during its forward travel into successive single bag lengths, each with a valve flap projecting from one end of the bag length in the laterally pleated area thereof.

25. In making valve bags, the method which comprises progressively forming a web into a laterally pleated tube, moving the tube away from its point of formation and successively at spaced intervals excising rectangular portions of the tube between the lateral pleats and severing the pleated sides at two diagonally opposite corners of each rectangle and thereby forming bag ends, each with a valve projecting from one of the laterally pleated areas thereof.

26. A bag machine comprising means for forming a paper web progressively into a laterally pleated tube as the web is advanced, and means for cutting the continuously advancing laterally pleated tube into successive single bag lengths, each with a projecting valve flap in the laterally pleated area of the bag length.

27. A bag machine comprising means for forming paper webs progressively into a multi-ply tube as the webs are advanced, and means for cutting the continuously advancing multi-ply tube into successive single bag lengths, each with a lateral valve flap projecting from one end of the multi-ply bag length.

28. A bag machine comprising means for forming paper webs progressively into a multi-ply, laterally-pleated tube as the webs are advanced, and means for cutting the continuously advancing multi-ply, laterally-pleated tube into successive single bag lengths, each with a lateral valve flap projecting from one end of the bag length.

In testimony whereof, I have hereunto signed my name to this specification.

CARL H. HARTMAN.